(12) United States Patent
Yamada et al.

(10) Patent No.: US 8,647,776 B2
(45) Date of Patent: Feb. 11, 2014

(54) CARBON MATERIAL FOR LITHIUM ION SECONDARY BATTERY

(75) Inventors: Shunsuke Yamada, Ibaraki (JP); Keita Yamaguchi, Kagawa (JP); Taisuke Nose, Kagawa (JP); Hideharu Sato, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 86 days.

(21) Appl. No.: 13/214,356

(22) Filed: Aug. 22, 2011

(65) Prior Publication Data

US 2012/0070733 A1   Mar. 22, 2012

Related U.S. Application Data

(63) Continuation of application No. PCT/JP2010/052546, filed on Feb. 19, 2010.

(30) Foreign Application Priority Data

Feb. 20, 2009   (JP) ................................ 2009-038092

(51) Int. Cl.
*H01M 4/583* (2010.01)
*C01B 31/04* (2006.01)

(52) U.S. Cl.
USPC ........................................ 429/231.8; 423/448

(58) Field of Classification Search
USPC .................... 429/121–347; 423/448
See application file for complete search history.

(56) References Cited

U.S. PATENT DOCUMENTS

| | | | | |
|---|---|---|---|---|
| 5,993,996 | A * | 11/1999 | Firsich ........................ | 429/231.8 |
| 6,268,086 | B1 * | 7/2001 | Honbo et al. ............... | 429/231.8 |
| 2005/0207966 | A1 * | 9/2005 | Zaghib ......................... | 423/448 |
| 2006/0154147 | A1 * | 7/2006 | Kurihara et al. ........... | 429/231.8 |
| 2010/0092864 | A1 * | 4/2010 | Yokomizo et al. ............ | 429/212 |

FOREIGN PATENT DOCUMENTS

| | | |
|---|---|---|
| CN | 101054174 A | 10/2007 |
| JP | 06-044959 | 2/1994 |
| JP | 08-293305 | 11/1996 |
| JP | 10-284080 | 10/1998 |
| JP | 2001-266872 | 9/2001 |
| JP | 2004-200115 | 7/2004 |
| JP | 2005-108456 | 4/2005 |
| WO | WO 2008/020620 A1 * | 2/2008 ............. H01M 4/58 |

OTHER PUBLICATIONS

International Search Report issued May 18, 2010 in PCT/JP10/052546 filed Feb. 19, 2010.
Chinese Office Action issued Jul. 19, 2013, in China Patent Application No. 201080008421.9 (with English translation).

* cited by examiner

*Primary Examiner* — Basia Ridley
*Assistant Examiner* — James Lee
(74) *Attorney, Agent, or Firm* — Oblon, Spivak, McClelland, Maier & Neustadt, L.L.P.

(57) ABSTRACT

To provide a negative electrode material capable of giving a lithium ion secondary battery that is sufficiently small in the charge/discharge irreversible capacity observed at the initial cycle stage, has excellent high-temperature storage characteristics, and reduced in the gas generation at the initial cycle stage as well as during high-temperature storage.

A carbon material for lithium ion secondary battery, wherein the surface functional group amount O/C value represented by the following formula 1 is from 1 to 4% and the sum (Cl/C+$S_{165}$/C) of the surface functional group amount Cl/C value represented by the following formula 2 and the surface functional group amount $S_{165}$/C value represented by the following formula 3 is from 0.05 to 0.5%:

O/C value (%)=O atom concentration determined based on the peak area of the spectrum of O1s in X-ray photoelectron spectroscopy (XPS) analysis/C atom concentration determined based on the peak area of the spectrum of C1s in XPS analysis×100   Formula 1:

Cl/C value (%)=Cl atom concentration determined based on the peak area of the spectrum of Cl2p in XPS analysis/C atom concentration determined based on the peak area of the spectrum of C1s in XPS analysis×100   Formula 2:

$S_{165}$/C value (%)=$S_{165}$ atom concentration based on the peak area of the peak near 165 eV in the spectrum corresponding to S2p in XPS analysis/C atom concentration determined based on the peak area of the spectrum of C1s in XPS analysis×100   Formula 3.

7 Claims, No Drawings

CARBON MATERIAL FOR LITHIUM ION SECONDARY BATTERY

TECHNICAL FIELD

The present invention relates to a carbon material for use in a lithium ion secondary battery, a lithium ion secondary battery negative electrode formed using the material, and a lithium ion secondary battery having the negative electrode.

BACKGROUND ART

With recent reduction in size of an electronic device, demands for a high-capacity secondary battery are increasing. Particularly, a lithium ion secondary battery having a high energy density and excellent large-current charge/discharge characteristics compared with a nickel•cadmium battery or a nickel•hydrogen battery is attracting attention. A high-capacity lithium ion secondary battery has been heretofore widely studied, but in recent years, high performance is also increasingly required of the lithium ion secondary battery, and it is demanded to further raise the capacity.

The negative electrode material used for such a lithium ion secondary battery is in many cases a graphite material or an amorphous carbon in view of cost and durability. As the method for raising the capacity of the lithium ion secondary battery, it is designed to increase the electrode density and pack a charge/discharge active material as much as possible in the limited battery volume.

A protective film called SEI (Solid Electrolyte Interface) is usually formed on the surface of the carbon material negative electrode by a reaction with an electrolytic solution, whereby chemical stability of the negative electrode is maintained. However, production of the SEI film is associated with generation of a gas as a side-reaction product. Particularly, in the case of a prismatic battery, the thickness of a battery case is expanded due to the gas generation. In anticipation of this battery swelling, the battery is designed by previously securing the volume for the generated gas portion and therefore, the limited battery volume cannot be effectively utilized as a volume for packing an active material.

Also, when the battery is stored at high temperatures, deterioration of the SEI film is liable to occur, and the negative electrode and the electrolytic solution react in the deteriorated site, giving rise to a problem that a larger amount of gas is generated. The gas generation amount is greatly governed by the stability of the SEI film and therefore, many studies to form a good SEI film are being made.

In view of mechanism that the SEI film is formed by a reaction of a negative electrode active material with an electrolytic solution, the film is highly subject to effects of the amount of an oxygen-containing functional group such as carboxyl group and carbonyl group on the carbon particle surface or the surface structure of a carbon material. For forming a good SEI film, it has been proposed to perform surface modification of the carbon material.

For example, Patent Document 1 discloses a carbon material where the content of an acidic functional group is 5 m-equivalent/kg or less and 0.3 µmol/m$^2$ or more. In this technique, the amount of an acidic functional group present on the carbon material surface is controlled by applying a physical impact to raw material graphite and therefore, reduction in the irreversible capacity at the initial charge/discharge or enhancement of cycle characteristics may be expected, but the SEI film is not sufficiently stabilized due to the small amount of an acidic functional group, and it must be said that high-temperature storage characteristics required in association with the demand for high capacity are not responded to.

Patent Document 2 discloses a method of performing a treatment with an acidic aqueous solution or an alkali aqueous solution at a temperature of 20 to 100° C. to introduce a surface functional group into the carbon material surface and uniformly form an SEI film. However, Patent Document 2 is silent on improvement for the increase of irreversible capacity ascribable to a reaction of an acidic functional group with an electrolytic solution at the initial charge as well as for the gas generation.

That is, as to the extent to which an acidic functional group should be introduced into the carbon material surface so as to suppress an excessive reaction of an acidic functional group with an electrolytic solution at the initial charge or the introduction amount in which an acidic functional group should be introduced into the carbon material surface so as to reduce the irreversible capacity and suppress the gas generation, is still not answered at present.

RELATED ART

Patent Document

Patent Document 1: JP-A-2005-108456 (the term "JP-A" as used herein means an "unexamined published Japanese patent application")

Patent Document 2: JP-A-2004-200115

SUMMARY OF THE INVENTION

Problems that the Invention is to Solve

The present invention has been made by taking into consideration the above-described background art, and an object of the present invention is to provide a negative electrode material for producing a lithium ion secondary battery that is sufficiently small in the charge/discharge irreversible capacity observed at the initial cycle stage and has excellent high-temperature storage characteristics, and in turn, provide a high-capacity lithium ion secondary battery.

Means for Solving the Problems

As a result of intensive studies to attain the above-described object, the present inventors have found that by using a carbon material on which surface, in addition to a predetermined amount of an oxygen-containing functional group such as carboxyl group and carbonyl group, a predetermined amount of a sulfo group or halogen group having stronger electron withdrawability than the oxygen-containing functional group and exhibiting high reaction activity with an electrolytic solution is present, not only an excessive reaction with an electrolytic solution at the initial charge can be suppressed to reduce the irreversible capacity and suppress the gas generation but also a stable SEI film can be formed and in turn, a lithium ion secondary battery with high capacity and excellent high-temperature storage characteristics can be obtained. The present invention has been accomplished based on this finding.

That is, the gist of the present invention is as follows.

(1) A carbon material for lithium ion secondary battery, wherein the surface functional group amount O/C value represented by the following formula 1 is from 1 to 4% and the sum (Cl/C+$S_{165}$/C) of the surface functional group amount Cl/C value represented by the following formula 2 and the surface functional group amount $S_{165}/C$ value represented by the following formula 3 is from 0.05 to 0.5%:

> O/C value (%)=O atom concentration determined based on the peak area of the spectrum of O1s in X-ray photoelectron spectroscopy (XPS) analysis/C atom concentration determined based on the peak area of the spectrum of C1s in XPS analysis×100    Formula 1:

> Cl/C value (%)=Cl atom concentration determined based on the peak area of the spectrum of Cl2p in XPS analysis/C atom concentration determined based on the peak area of the spectrum of C1s in XPS analysis×100    Formula 2:

> $S_{165}/C$ value (%)=$S_{165}$ atom concentration based on the peak area of the peak near 165 eV in the spectrum corresponding to S2p in XPS analysis/C atom concentration determined based on the peak area of the spectrum of C1s in XPS analysis×100    Formula 3:

(2) The carbon material for lithium ion secondary battery as described in (1) above, wherein the BET specific surface area (SA) is from 4 to 11 m²/g, the tap density is from 0.7 to 1.3 g/cm³, the Raman R value is from 0.15 to 0.4, and the fluidity index is from 0.4 to 0.53.

(3) The carbon material for lithium ion secondary battery as described in (1) or (2) above, wherein the abundance ratio (3R/2H) of rhombohedral crystal to hexagonal crystal, obtained from X-ray structural analysis (XRD), is 0.20 or more.

(4) The carbon material for lithium ion secondary battery as described in any one of (1) to (3) above, which is produced by a production method comprising: contacting raw material graphite with an acid containing at least one of hydrochloric acid and sulfuric acid; and heat-treating the graphite contacted with an acid containing at least one of hydrochloric acid and sulfuric acid, at 100 to 600° C.

(5) The carbon material for lithium ion secondary battery as described in (4) above, wherein the raw material graphite described in (4) above is natural graphite subjected to a spheroidization treatment, and the surface functional group amount O/C value represented by the formula 1 above of the spheroidized natural graphite is from 1 to 4%.

(6) A negative electrode for lithium ion secondary battery, comprising a current collector and an active material layer formed on the current collector, wherein the active material layer contains the carbon material described in any one of (1) to (5) above.

(7) A lithium ion secondary battery comprising: a positive electrode and a negative electrode capable of storing and releasing lithium ion; and an electrolyte, wherein the negative electrode is the negative electrode for lithium ion secondary battery described in (6) above.

Advantage of the Invention

The carbon material of the present invention can provide a lithium ion secondary battery with high capacity, excellent high-temperature storage characteristics and small gas generation amount by using it as an active material for lithium ion battery.

MODE FOR CARRYING OUT THE INVENTION

The contents of the present invention are described in detail below. Incidentally, the following description of constitutional requirements of the invention is one example (representative example) of the mode for carrying out the present invention, and the present invention is not limited to these embodiments as long as the purport of the present invention is observed.

The carbon material for lithium ion secondary battery of the present invention is characterized in that the surface functional group amount O/C value represented by formula 1 is from 1 to 4% and the sum (Cl/C+$S_{165}$/C) of the surface functional group amount Cl/C value represented by formula 2 and the surface functional group amount $S_{165}$/C value represented by formula 3 is from 0.05 to 0.5%.

<Surface Functional Group Amount in X-Ray Photoelectron Spectroscopy (XPS)>

(i) Measuring Method

The surface functional group amount O/C value and the sum (Cl/C+$S_{165}$/C) of the surface functional group amount Cl/C value and the surface functional group amount $S_{165}$/C value of the carbon material of the present invention are determined by X-ray photoelectron spectroscopy (XPS) as follows.

Surface Functional Group Amount O/C Value (%):

The measurement of X-ray photoelectron spectroscopy is performed using a commercially available X-ray photoelectron spectrometer (for example, "ESCA" manufactured by ULVAC-PHI, Inc.). The measurement target (here, graphite material) is placed on a sample stage by arranging the surface to lie flat and measured for the spectra of C1s (280 to 300 eV) and O1s (525 to 545 eV) by multiplex measurement using Kα ray of aluminum as the X-ray source. After charge correction by setting the obtained peak top of C1s at 284.3 eV, the peak areas of the spectra of C1s and O1s are determined and further multiplied by an apparatus sensitivity coefficient to calculate the surface atom concentrations of C and O, respectively. The atom concentration ratio O/C of O to C, (O atom concentration/C atom concentration)×100, is defined as the surface functional group amount O/C value of the carbon material.

Surface Functional Group Amount Cl/C Value (%):

The spectra of C1s (280 to 300 eV) and Cl2p (195 to 205 eV) are measured by the same method as above, and the peak areas of the spectra of C1s and Cl2p are determined and further multiplied by an apparatus sensitivity coefficient to calculate the surface atom concentrations of C and Cl, respectively. The atom concentration ratio Cl/C of Cl to C(Cl atom concentration/C atom concentration)×100 is defined as the surface functional group amount Cl/C value of the carbon material.

Surface Functional Group Amount $S_{165}$/C Value (%):

The spectrum of C1s (280 to 300 eV) and the spectrum of S2p (160 to 175 eV) are measured by the same method as above, and the peak area of the spectrum of C1s and the peak area of the peak near 165 eV in the spectrum corresponding to S2p present in the range of 160 to 175 eV are determined and further multiplied by an apparatus sensitivity coefficient to calculate the surface atom concentrations of C and $S_{165}$, respectively. The atom concentration ratio $S_{165}$/C of $S_{165}$ to C, ($S_{165}$ atom concentration/C atom concentration)×100, is defined as the surface functional group amount $S_{165}$/C value of the carbon material.

In general, the peak corresponding to S2P of sulfate derived from $FeSO_4$ or $CuSO_4$ attaching as an impurity to the graphite surface is known to be observed near 170 eV. On the other hand, the carbon material of the present invention is characterized in that the S element corresponding to the peak near 165 eV is directly introduced as a functional group such as sulfo group or sulfonyl group into the graphite surface.

(ii) Preferred Ranges

The surface functional group amount O/C value determined by XPS of the carbon material of the present invention is from 1 to 4%, preferably from 2 to 3.6%, more preferably from 2.6 to 3%. At the same time, the sum of the surface functional group amount Cl/C value and the surface functional group amount $S_{165}$/C value is from 0.05 to 0.5%, preferably 0.07 to 0.3%, more preferably from 0.1 to 0.15%.

If the surface functional group amount O/C value determined by XPS of the carbon material is less than 1% and the sum of the surface functional group amount Cl/C value and the surface functional group amount $S_{165}$/C value is less than 0.05%, the reaction of the particle surface with the electrolytic solution insufficiently proceeds to fail in producing stable SEI, and the gas generation amount is increased by the decomposition of SEI. Also, if the surface functional group amount O/C value exceeds 4% and the sum of the surface functional group amount Cl/C value and the surface functional group amount $S_{165}$/C value exceeds 0.5%, reactivity with the electrolytic solution is intensified due to increase in the functional group amount on the particle surface and in turn, the gas generation amount is increased.

<Particle Diameter>
(i) Measuring Method

After suspending 0.01 g of a graphite material in 10 mL of a 0.2 mass % aqueous solution of polyoxyethylene sorbitan monolaurate (for example, Tween 20 (registered trademark)) as a surfactant, the suspension is introduced into a commercially available laser diffraction/scattering particle size distribution measuring apparatus (for example, "LA-920", manufactured by HORIBA Ltd.) and irradiated with an ultrasonic wave of 28 kHz at an output of 60 W for 1 minute, and the diameter measured as a volume-based median diameter in the measurement apparatus is defined as d50 in the present invention.

(ii) Preferred Range

The particle diameter of the carbon material of the present invention is not particularly limited, but as for the range in which the carbon material is used, d50 is preferably 50 μm or less, more preferably 30 μm or less, still more preferably 25 μm or less, and is preferably 1 μm or more, more preferably 4 μm or more, still more preferably 10 μm or more.

With a particle diameter of 50 μm or less, the carbon material, when formed into a polar plate, scarcely involves a trouble such as streaking in the process. Also, with a particle diameter of 1 μm or more, the carbon material can be kept from having an excessively large surface area and exhibiting excessive activity with the electrolytic solution.

<BET Specific Surface Area (SA)>
(i) Measuring Method

The BET specific surface area of the carbon material of the present invention is measured by a BET one-point method using a commercially available specific surface area measuring apparatus (for example, "AMS8000", manufactured by Ohkura Riken Co., Ltd.) according to a nitrogen gas adsorption flow process. Specifically, 0.4 g of a sample (carbon material) is filled in a cell, pretreated by heating at 350° C., cooled to a liquid nitrogen temperature to cause saturated adsorption of a gas consisting of 30% of nitrogen and 70% of He, and then heated to room temperature, and after measuring the amount of desorbed gas, the specific surface area is calculated from the obtained result by a normal BET method.

(ii) Preferred Range

The specific surface area of the carbon material of the present invention as measured by the BET method is preferably 4 $m^2$/g or more, more preferably 5 $m^2$/g or more, and is preferably 11 $m^2$/g or less, more preferably 9 $m^2$/g or less, still more preferably 8 $m^2$/g or less.

When the BET specific surface area of the carbon material is 4 $m^2$/g or more, a sufficiently large site for entering/leaving of Li is present and excellent rapid charge/discharge characteristics and output characteristics are obtained. On the other hand, when the specific surface area is 11 $m^2$/g or less, the active material can be kept from becoming excessively active with the electrolytic solution, and an excessive increase in the initial irreversible capacity can be suppressed, so that a high-capacity battery can be produced.

<Tap Density>
(i) Definition of Tap Density

As for the tap density of the carbon material of the present invention, a density determined as follows is defined as the tap density. Using a powder density meter, "Tap Denser KYT-4000", manufactured by Seishin Enterprise Co., Ltd., the carbon material is caused fall in a cylindrical tap cell having a diameter of 1.6 cm and a volume capacity of 20 $cm^3$ through a sieve having a sieve opening of 300 μm to fill up the cell. Thereafter, tapping with a stroke length of 10 mm is performed 1,000 times, and the density determined from the volume here and the weight of the sample is taken as the tap density.

(ii) Preferred Range

The tap density of the carbon material of the present invention is preferably 0.7 g/$cm^3$ or more, more preferably 0.85 g/$cm^3$ or more, and is preferably 1.3 g/$cm^3$ or less, more preferably 1.2 g/$cm^3$ or less.

When the tap density of the carbon material is 0.7 g/$cm^3$, excellent rapid charge/discharge characteristics are obtained. Also, when the tap density is 1.3 g/$cm^3$ or less, reduction in rollability due to increase in the carbon density inside a particle can be prevented and formation of a high-density negative electrode sheet is facilitated.

<Fluidity Index>
(i) Definition of Fluidity Index

The fluidity index is determined by the Kawakita tap density measuring method (for example, a leveling determination-weight tap density measuring method using "Tap Denser KYT-4000", manufactured by Seishin Enterprise Co., Ltd.) according to the Kawakita formula.

Specifically, in the leveling determination-weight tap density measuring method, the carbon material is caused to fall in a cylindrical tap cell having a diameter of 1.6 cm and a volume capacity of 20 $cm^3$ through a sieve having a sieve opening of 300 μm to fill up the cell, and then, tapping with a stroke length of 10 mm is performed 1,000 times at a maximum.

The volume loss ratio $C=(V_0-V_N)/V_0$ of the sample is calculated from the number N of tappings, initial volume $V_0$ and volume $V_N$ after N tappings in the tap density measuring method above, and the relationship between N and N/C is derived from a graph obtained by taking N/C on the ordinate and N on the abscissa. Thereafter, the fluidity index is calculated according to the Kawakita formula and used for evaluating the fluidity.

Here, the Kawakita formula is a formula represented by $N/C=(1/a)N+1/(ab)$, wherein a is the fluidity index. That is, the reciprocal of the gradient of a straight line obtained from the graph where N/C is taken on the ordinate and N is taken on the abscissa, is the fluidity index a.

(ii) Preferred Range

The fluidity index of the carbon material of the present invention is preferably 0.4 or more, more preferably 0.44 or more, and is preferably 0.53 or less.

When the surface functional group amount of the carbon material is small, the fluidity index becomes large. By setting the fluidity index to 0.53 or less, the reaction between the particle surface and the electrolytic solution can sufficiently proceed, so that stable SEI can be produced and the gas generation amount can be prevented from increasing due to decomposition of SEI. On the other hand, by setting the fluidity index to 0.4 or more, an excessive reaction of the functional group in an excess amount on the particle surface with the electrolytic solution can be suppressed, and increase in the gas generation amount can be prevented. Also, when the fluidity index is 0.4 or more, slipperiness of the carbon material is improved to ensure excellent rollability of a negative electrode sheet and therefore, formation of a high-density negative electrode sheet is facilitated.

<Raman R Value>

(i) Definition

As for the Raman R value, the Raman spectrum is measured by the Raman method and with respect to the obtained Raman spectrum, the intensity $I_A$ of the peak $P_A$ near 1,580 cm$^{-1}$ and the intensity $I_B$ of the peak $P_B$ near 1,360 cm$^{-1}$ are measured. The intensity ratio $R(R=I_B/I_A)$ is calculated and defined as the Raman R value of the carbon material.

The Raman spectrum can be specifically measured, for example, by the following method and conditions. The measurement target particles are caused to freely fall in and fill the measurement cell, and the measurement is performed while irradiating the measurement cell with argon ion laser light and rotating the measurement cell within a plane perpendicular to the laser light.

Raman spectrometer: "Raman Spectrometer", manufactured by JASCO Corp.

Wavelength of argon ion laser light: 514.5 nm

Laser power on sample: 25 mW

Resolution: 4 cm$^{-1}$

Measured range: from 1,100 to 1,730 cm$^{-1}$

Measurement of peak intensity, measurement of peak half width: background processing, smoothing processing (5 points in convolution as computed by a simple average)

(ii) Preferred Range and Characteristic Features

The Raman R value of the carbon material of the present invention is preferably 0.15 or more, more preferably 0.17 or more, and is preferably 0.4 or less, more preferably 0.3 or less.

By setting the Raman R value of the carbon material to 0.17 or more, the crystallinity on the particle surface can be kept from becoming too high and the load characteristics can be prevented from deterioration due to propensity of crystals for orientation in the parallel direction to the electrode plate formed to a high density. On the other hand, by setting it to 0.4 or less, an excessive reaction with the electrolytic solution due to disturbance of crystals on the particle surface can be suppressed and reduction in efficiency or increase of gas generation can be prevented.

<Abundance Ratio (3R/2H) of Rhombohedral Crystal to Hexagonal Crystal Obtained from X-Ray Structural Analysis (XRD)>

(i) Measuring Method

As for the abundance ratio (3R/2H) of rhombohedral crystal to hexagonal crystal obtained from X-ray structural analysis (XRD) of the carbon material of the present invention, 3R and 2H are measured using a commercially available X-ray diffraction apparatus (for example, "JDX-3500", manufactured by JEOL Ltd.), and 0.3R/2H is calculated.

Specifically, the abundance ratio is calculated as follows. The carbon material is filled in a 0.2 mm sample plate while preventing orientation and measured by an X-ray diffraction apparatus ("JDX-3500", manufactured by JEOL Ltd.) with CuKα ray at an output of 30 kV and 200 mA. After subtracting the background from the obtained two peaks of 3R(101) near 43.4° and 2H(101) near 44.5°, the intensity ratio 3R(101)2H(101) is calculated.

(ii) Preferred Range

The abundance ratio (3R/2H) of rhombohedral crystal to hexagonal crystal obtained from X-ray structural analysis (XRD) of the carbon material of the present invention is preferably 0.20 or more, more preferably 0.23 or more, still more preferably 0.25 or more. When 3R/2H is 0.20 or more, deterioration of rapid charge/discharge characteristics can be prevented.

The raw material of the carbon material of the present invention is not particularly limited as long as it is a graphitized carbon particle, but examples thereof include natural graphite, artificial graphite, coke powder, needle coke powder and graphitized resin powder. Among these raw material graphites, natural graphite is preferred, and spherical graphite (sometimes referred to as "spheroidized natural graphite") obtained through spheroidization treatment is more preferred. The spherical graphite is preferably composed of a plurality of curved or bent graphite scales or flakes, or a graphite fine powder obtained by grinding.

Also, in the raw material graphite of the carbon material, the surface functional group amount O/C value represented by formula 1 as determined by XPS is preferably from 1 to 4%, more preferably from 2 to 3.6%, and most preferably from 2.6 to 3%.

When the surface functional group amount O/C value of the raw material graphite is 1% or more, a sufficient amount of an active acidic functional group such as hydroxyl group and carboxyl group present on the graphite surface can be ensured and the amount of a chloro group or a sulfo group introduced is prevented from decreasing when performing a contact treatment with hydrochloric acid or sulfuric acid. On the other hand, when it is 4% or less, an excessive reaction with the electrolytic solution due to increase in the functional group amount on the particle surface can be suppressed and the gas generation amount can be kept from increasing.

<Production Method of Carbon Material>

The method for producing the carbon material of the present invention from the above-described raw material is, for example, typically a production method including the following steps.

Production Method 1:

(First step) a step of subjecting the raw material graphite to an acid contact treatment with an acid containing at least either sulfuric acid or hydrochloric acid;

(Second step) a step of subjecting the graphite treated in the first step directly or, if desired, after washing with water to a heat treatment at 100 to 600° C.

Here, when an acid contact treatment with an acid containing at least either sulfuric acid or hydrochloric acid is applied to the raw material graphite, for example, an electrophilic substitution reaction with aromatic hydrocarbon contained in the graphite surface, an electrophilic addition reaction with alkane moiety, or a substituting reaction with an oxygen functional group such as carboxyl group and carbonyl group proceeds to introduce a sulfo group and a chloro group, and this is preferred because SEI film is stably formed.

Furthermore, in performing the acid contact treatment, when a pretreatment with an oxidizing agent such as nitric acid and an acid contact treatment using an acid mixed with an oxidizing agent such as nitric acid are performed, the surface functional group amount O/C value represented by formula 1 determined by XPS of the raw material graphite can be more efficiently enhanced and this is preferred.

Incidentally, the acid contact treatment in the first step of the production method 1 may use an acid containing at least either sulfuric acid or hydrochloric acid. An acid where another acid, for example, an inorganic acid such as bromic acid, hydrofluoric acid, boric acid and iodic acid, or an organic acid such as citric acid, formic acid, acetic acid, oxalic acid, trichloroacetic acid and trifluoroacetic acid, is appropriately mixed, may be also used. However, as described later, in the case of using an acid that works as an oxidizing agent, such as nitric acid, a step for sulfuric acid contact treatment is sometimes required to be separately performed.

In general, when graphite is subjected to a contact treatment using sulfuric acid mixed with an oxidizing agent such as nitric acid, a graphite-acid intercalation compound is produced and if heat-treated, this brings about production of so-called expanded graphite where the interlayer distance of graphite is expanded. Occurrence of such expansion of particle may give rise to reduction in energy density, reduction in durability of graphite particle, and reduction in strength of electrode produced using the graphite material.

Accordingly, in subjecting the graphite to an acid contact treatment using an acid mixed with an oxidizing agent such as nitric acid, the preferred method is, for example, typically a production method including the following steps.

Production Method 2:

(First step) a step of subjecting the raw material graphite to an acid contact treatment with an acid containing at least hydrochloric acid or nitric acid but not containing sulfuric acid, (Second step) a step of further subjecting the graphite treated in the first step directly or, if desired, after washing with water to a heat treatment at 100 to 600° C. as needed, (Third step) a step of subjecting the graphite treated in the second step to a contact treatment with sulfuric acid, and (Fourth step) a step of subjecting the graphite treated in the third step directly or, if desired, after washing with water to a heat treatment at 100 to 600° C.

The acid contact treatment in the first step of the production method 1 and the first and third steps of the production method 2 is performed by dipping the graphite in the above-described acidic solution. The dipping time here is usually on the order of 0.5 to 48 hours. Usually, the acid contact treatment is preferably performed at 20 to 95° C.

Also, in performing the acid contact treatment, the acid is used in an amount of, as the weight of the acid solution, usually from 5 to 500 wt %, preferably from 10 to 300 wt %, more preferably from 15 to 200 wt %, based on the weight of graphite. If the amount of the acid is too large, the efficiency of the water washing step tends to become bad, whereas if it is excessively small, the liquid is not uniformly wetted on the graphite surface and a chloro group or a sulfo group is liable to be insufficiently introduced into the graphite surface.

In the case of mixing concentrated hydrochloric acid and concentrated nitric acid in the first step of the production method 2, the amount of the concentrated nitric acid is usually from 20 to 500 wt %, preferably from 30 to 300 wt %, more preferably from 50 to 150 wt %, based on the hydrochloric acid.

As described in Examples later, a washing treatment with pure water may be performed after the acid contact treatment of the graphite, and in this case, washing is performed until the pH becomes approximately from 3 to 6.

In the second step of the production method 1 and the second and fourth steps of the production method 2, the heat treatment time of the heat treatment step is usually on the order of 1 to 24 hours. Also, by performing the heat treatment at 100° C. or more, the acidic functional group can be sufficiently introduced into the carbon material surface, and by performing the heat treatment at 600° C. or less, the acidic functional group introduced can be prevented from desorbing.

<Configuration of Lithium Ion Secondary Battery>

The lithium ion secondary battery of the present invention produced using the carbon material of the present invention and a negative electrode sheet containing the carbon material is composed of members required for battery configuration, such as positive electrode, electrolytic solution, separator, cylindrical, prismatic or laminate can, large-size can for automobiles or stationary batteries, housing, PTC element and insulating plate, and selection of these members is not particularly limited as long as the purport of the present invention is observed.

The lithium ion secondary battery of the present invention usually comprises at least the following negative electrode of the present invention, a positive electrode and an electrolyte.

<Negative Electrode and Negative Electrode Sheet for Non-aqueous Secondary Battery>

The carbon material of the present invention can be suitably used as a negative electrode active material of a non-aqueous secondary battery, particularly, a lithium ion secondary battery. A material containing the carbon material (A) of the present invention and one or more carbonaceous particles differing in the shape or physical properties from the composite graphite particle above (hereinafter simply referred to as a "carbonaceous particle (B)") selected from the group consisting of natural graphite, artificial graphite, vapor phase grown carbon fiber, electroconductive carbon black, amorphous coated graphite, resin coated graphite and amorphous carbon may be also suitably used as the negative electrode active material.

By appropriately selecting the carbonaceous particle (B) and mixing it with the carbon material (A) of the present invention, it becomes possible to prevent the Li diffusion path on the polar plate surface from being blocked due to particle deformation and reduce the irreversible capacity. In the case of mixing the carbonaceous particle (B), the lower limit of the amount thereof is usually 5 mass % or more, preferably 10 mass % or more, more preferably 20 mass % or more, and the upper limit is usually 95 mass % or less, preferably 90 mass % or less, more preferably 80 mass % or less, based on the entire negative electrode material. With an amount not less than the range above, the initial irreversible capacity can be kept from increasing, and with an amount not more than the range above, reduction in the electrical conductivity can be prevented.

The apparatus used for mixing the carbon material (A) of the present invention and the carbonaceous particle (B) is not particularly limited, but examples of a rotary mixer include a cylindrical mixer, a twin cylindrical mixer, a double conical mixer, a regular cubic mixer and a plow-type mixer, and examples of a fixed mixer include a helical mixer, a ribbon-type mixer, a Muller-type mixer, a Helical Flight-type mixer, a Pugmill-type mixer, a fluidized-type mixer, Theta Composer, Hybridizer and Mechanofusion.

Also, a part of the active material constituting the negative electrode sheet may contain an alloy alloyable with Li, a silicide and a semiconductor electrode. Specifically, for example, Si, Al, Sn, SnSb, SnAs, SiO, SnO, $SnO_2$, SiC, a semiconductor obtained by incorporating an impurity such as B, N and P into diamond, and a composite alloy or nonstoichiometric oxide composed of such a substance may be considered.

The negative electrode sheet has a configuration composed of a current collector and an active material layer containing the carbon material of the present invention, a particle described above, a polar plate-forming binder, a thickener and an electrically conductive material. The active material layer is usually obtained by coating a current collector with a slurry prepared from these members except for a current collector, drying the coating and rolling it to a desired density.

As for the polar plate-forming binder, an arbitrary material may be used as long as it is stable to a solvent or an electrolytic solution used at the electrode production. Examples thereof include polyvinylidene fluoride, polytetrafluoroethylene, polyethylene, polypropylene, styrene/butadiene rubber, isoprene rubber, butadiene rubber, an ethylene-acrylic acid copolymer, and an ethylene-methacrylic acid copolymer. The polar plate-forming binder is used in a ratio of, in terms of the weight ratio of negative electrode material/polar plate-forming binder, usually 90/10 or more, preferably 95/5 or more, and usually 99.9/0.1 or less, preferably 99.5/0.5 or less.

Examples of the thickener include carboxymethyl cellulose, Na salt thereof, methyl cellulose, hydroxymethyl cellulose, ethyl cellulose, hydroxypropyl cellulose, polyvinyl alcohol, starch oxide, starch phosphate and casein. These thickeners may be used without limitation, but those undergoing no structural change on the basic side are preferred.

Examples of the electrically conductive material include a fine metal powder material such as copper and nickel, and a small particle-size carbon material such as graphite and carbon black.

Examples of the material for the current collector include copper, nickel and stainless steel. Among these, a copper foil is preferred in view of easy formability into a thin film and cost.

The density of the active material layer varies depending on use, but in the usage attaching importance to the capacity, the density is usually 1.55 g/cm$^3$ or more, preferably 1.60 g/cm$^3$ or more. If the density is too low, the battery capacity per unit volume is insufficient, whereas if the density is excessively high, the rapid charge/discharge characteristics are deteriorated. For this reason, generally, in the case of a negative electrode sheet composed of only a carbon material, the density is preferably 1.90 g/cm$^3$ or less. The "active material layer" as used herein indicates a mixture layer composed of an active material, a polar plate-forming binder, a thickener, an electrically conductive material and the like, on a current collector, and the density thereof indicates the bulk density of the active material layer at the time of assembling it into a battery.

<Nonaqueous Secondary Battery>

The negative electrode for nonaqueous secondary battery, produced using the carbon material of the present invention is very useful in particular as a negative electrode of a nonaqueous secondary battery such as lithium ion secondary battery. The selection of members required for battery configuration, such as positive electrode and electrolytic solution constituting such a nonaqueous secondary battery, is not particularly limited. In the following, examples of the material or the like for members constituting the nonaqueous secondary battery are described, but the material which can be used is not limited to these specific examples.

The nonaqueous secondary battery of the present invention usually comprises at least the negative electrode of the present invention, a positive electrode and an electrolyte.

The positive electrode is produced by forming an active material layer containing a positive electrode active material, an electrically conductive agent and a polar plate-forming binder, on a positive electrode current collector. The active material layer is usually obtained by preparing a slurry containing a positive electrode active material, an electrically conductive agent and a polar plate-forming binder, and coating and drying the slurry on a current collector.

As for the positive electrode active material, a material capable of storing/releasing lithium, for example, a lithium-transition metal composite oxide material such as lithium cobalt oxide, lithium nickel oxide and lithium manganese oxide, a transition metal oxide material such as manganese dioxide, or a carbonaceous material such as graphite fluoride, may be used. Specific examples of the material which can be used include $LiFePO_4$, $LiFeO_2$, $LiCoO_2$, $LiNiO_2$, $LiMn_2O_4$, their nonstoichiometric compounds, $MnO_2$, $TiS_2$, $FeS_2$, $Nb_3S_4$, $Mo_3S_4$, $CoS_2$, $V_2O_5$, $P_2O_5$, $CrO_3$, $V_3O_3$, $TeO_2$, $GeO_2$, and $LiNi_{0.33}Mn_{0.33}CO_{0.33}O_2$.

Examples of the electrically conductive material for the positive electrode include carbon black and small particle-size graphite.

As for the positive electrode current collector, a metal capable of forming a passivation film on the surface through anodic oxidation in an electrolytic solution, or an alloy thereof is preferably used, and examples thereof include metals belonging to Groups IIIa, IVa and Va (Groups 3B, 4B and 5B), and alloys thereof. Specific examples include Al, Ti, Zr, Hf, Nb, Ta and an alloy containing such a metal, and Al, Ti, Ta and an alloy containing such a metal can be preferably used. Above all, Al and an alloy thereof are preferred, because they are lightweight and in turn, ensure a high energy density.

Examples of the electrolyte include an electrolytic solution, a solid electrolyte and a gelled electrolyte. Among these, an electrolytic solution is preferred, and a nonaqueous electrolytic solution is more preferred. A nonaqueous electrolytic solution obtained by dissolving a solute in a nonaqueous solvent may be used.

Examples of the solute which can be used include an alkali metal salt and a quaternary ammonium salt. Specifically, for example, one or more compounds selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$ are preferably used.

Examples of the nonaqueous solvent include a cyclic carbonate such as ethylene carbonate, butylene carbonate and propylene carbonate; a cyclic ester compound such as γ-butyrolactone; a chain ether such as 1,2-dimethoxyethane; a cyclic ether such as crown ether, 2-methyltetrahydrofuran, 1,2-dimethyltetrahydrofuran, 1,3-dioxolane and tetrahydrofuran; and a chain carbonate such as diethyl carbonate, ethyl methyl carbonate and dimethyl carbonate. For each of the solute and the solvent, one kind may be selected and used, or two or more kinds may be mixed and used. Among these, a nonaqueous solvent containing a cyclic carbonate and a chain carbonate is preferred. Also, a compound such as vinylene carbonate, vinylethylene carbonate, succinic anhydride, maleic anhydride, propanesultone and diethylsulfone, and a difluorophosphate such as lithium difluorophosphate, may be added. Furthermore, an overcharge inhibitor such as diphenylether and cyclohexylbenzene may be also added.

The content of the solute in the electrolytic solution is preferably 0.2 mol/L or more, more preferably 0.5 mol/L or more, and is preferably 2 mol/L or less, more preferably 1.5 mol/L or less.

Above all, a lithium ion secondary battery produced by combining the negative electrode of the present invention with a metal chalcogenide-based positive electrode and a nonaqueous electrolytic solution mainly composed of a carbonate-based solvent has large capacity and is small in the irreversible capacity observed in the initial cycle and excellent in the rapid charge/discharge characteristics.

For preventing a positive electrode from coming into physical contact with a negative electrode, a separator is usually provided between the positive electrode and the negative electrode. The separator preferably has high ion permeability and low electric resistance. The material and shape of the separator are not particularly limited, but those stable to an electrolytic solution and excellent in the liquid retentivity are preferred. Specific examples thereof include a porous sheet and a nonwoven fabric, whose raw material is a polyolefin such as polyethylene and polypropylene.

The shape of the lithium ion secondary battery of the present invention is not particularly limited, and examples thereof include a cylinder type obtained by forming a sheet electrode and a separator into a spiral shape, a cylinder type of an inside-out structure obtained by combining a pellet electrode and a separator, and a coin type obtained by stacking a pellet electrode and a separator.

EXAMPLES

Specific embodiments of the present invention are described in greater detail below by referring to Examples, but the present invention is not limited to these Examples.
<Evaluation of Physical Properties of Negative Electrode Material>
(1) Particle Diameter d50

After suspending 0.01 g of the measurement target sample in 10 mL of a 0.2 mass % aqueous solution of polyoxyethylene sorbitan monolaurate (Tween 20 (registered trademark)), the suspension was introduced into a measuring apparatus ("LA-920", manufactured by HORIBA Ltd.) and irradiated with an ultrasonic wave of 28 kHz at an output of 60 W for 1 minute, and the diameter measured as a volume-based median diameter in the measurement apparatus was defined as d50.

(2) Tap Density

Using "Tap Denser KYT-4000", manufactured by Seishin Enterprise Co., Ltd., the measurement target sample was caused to fall in a cylindrical tap cell having a diameter of 1.6 cm and a volume capacity of 20 cm$^3$ through a sieve having a sieve opening of 300 μm to fill up the cell. Thereafter, tapping with a stroke length of 10 mm was performed 1,000 times, and the density determined from the volume here and the weight of the sample was taken as the tap density.

(3) Fluidity Index a

The fluidity index a was calculated according to the Kawakita formula by the leveling determination-weight tap density measuring method using "Tap Denser KYT-4000", manufactured by Seishin Enterprise Co., Ltd.). The measurement target sample was caused to fall in a cylindrical tap cell having a diameter of 1.6 cm and a volume capacity of 20 cm$^3$ through a sieve having a sieve opening of 300 μm to fill up the cell, and then, tapping with a stroke length of 10 mm was performed 1,000 times at a maximum.

The volume loss ratio $C=(V_0-V_N)/V_0$ of the sample was calculated from the number N of tappings, initial volume $V_0$ and volume $V_N$ after N tappings, and the relationship between N and N/C was derived from a graph obtained by taking N/C on the ordinate and N on the abscissa. Thereafter, the fluidity index a was calculated according to the Kawakita formula: $N/C=(1/a)N+1/(ab)$.

(4) BET Specific Surface Area (SA)

The BET specific surface area was measured using "AMS8000", manufactured by Ohkura Riken Co., Ltd. according to a nitrogen gas adsorption flow process. That is, 0.4 g of the measurement target sample was filled in a cell, pretreated by heating at 350° C., cooled to a liquid nitrogen temperature to cause saturated adsorption of a gas consisting of 30% of nitrogen and 70% of He, and then heated to room temperature, and after measuring the amount of desorbed gas, the specific surface area was calculated from the obtained result by a BET one-point method.

(5) Raman R Value

The measurement target sample was caused to freely fall in and fill the measurement cell, and the measurement was performed while irradiating the measurement cell with argon ion laser light and rotating the measurement cell within a plane perpendicular to the laser light. The conditions of Raman spectrum measurement were as follows.

Raman spectrometer: "Raman Spectrometer", manufactured by JASCO Corp.
Wavelength of argon ion laser light: 514.5 nm
Laser power on sample: 25 mW
Resolution: 4 cm$^{-1}$
Measured range: from 1,100 to 1,730 cm$^{-1}$
Measurement of peak intensity, measurement of peak half width: background processing, smoothing processing (5 points in convolution as computed by a simple average)

With respect to the obtained Raman spectrum, the intensity $I_A$ of the peak $P_A$ near 1,580 cm$^{-1}$ and the intensity $I_B$ of the peak $P_B$ near 1,360 cm$^{-1}$ were measured, and the intensity ratio $R(R=I_B/I_A)$ was calculated and defined as the Raman R value.

(6) Surface Functional Group Amount O/C Value and Sum (Cl/C+$S_{165}$/C) of Surface Functional Group Amount Cl/C Value and Surface Functional Group Amount $S_{165}$/C Value The measurement target sample was placed on the sample stage of an X-ray photoelectron spectrometer (ESCA manufactured by ULVAC-PHI, Inc.) by arranging the surface to lie flat and measured for the spectrum under the following conditions by multiplex measurement using Kα ray of aluminum as the X-ray source, and the surface functional group amount O/C value and the sum (Cl/C+$S_{165}$/C) of the surface functional group amount Cl/C value and the surface functional group amount $S_{165}$/C value were calculated.

Surface Functional Group Amount O/C Value (%):

After charge correction by setting the obtained peak top of C1s at 284.3 eV, the peak areas of the spectra of C1s and O1s were determined and further multiplied by an apparatus sensitivity coefficient to calculate the surface atom concentrations of C and O, respectively. The atom concentration ratio O/C of O to C, (O atom concentration/C atom concentration)×100, was defined as the surface functional group amount O/C value.

Surface Functional Group Amount Cl/C Value (%):

The spectra of C1s (280 to 300 eV) and Cl2p (195 to 205 eV) were measured by the same method as above, and the peak areas of the spectra of C1s and Cl2p were determined and further multiplied by an apparatus sensitivity coefficient to calculate the surface atom concentrations of C and Cl, respectively. The atom concentration ratio Cl/C of Cl to C(Cl atom concentration/C atom concentration)×100 was defined as the surface functional group amount Cl/C value.

Surface Functional Group Amount $S_{165}$/C Value (%):

The spectrum of C1s (280 to 300 eV) and the spectrum of S2p (160 to 175 eV) were measured, and the peak area of the spectrum of C1s and the peak area of the peak near 165 eV in the spectrum corresponding to S2p present in the range of 160 to 175 eV were determined and further multiplied by an apparatus sensitivity coefficient to calculate the surface atom concentrations of C and $S_{165}$, respectively. The atom concentration ratio $S_{165}$/C of $S_{165}$ to C, ($S_{165}$ atom concentration/C atom concentration)×100, was calculated and defined as the surface functional group amount $S_{165}/C$ value of the graphite material.

(7) 3R/2H

The measurement target sample was filled in a 0.2 mm sample plate while preventing orientation and measured by an X-ray diffraction apparatus ("JDX-3500", manufactured by JEOL Ltd.) with CuKα ray at an output of 30 kV and 200 mA. After subtracting the background from the obtained two peaks of 3R(101) near 43.4° and 2H(101) near 44.5°, the intensity ratio 3R(101)/2H(101) was calculated.

<Measurement Method of Negative Electrode>

(i) Production Method and Measurement of Negative Electrode Sheet

Using the carbon material having the properties shown in Table 1 as the negative electrode material, a polar plate having an active material layer with an active material layer density of 1.60±0.03 g/cm³ was produced. Specifically, 20.00±0.02 g of the negative electrode material above, 20.00±0.02 g (0.200 g as solid content) of an aqueous 1 mass % carboxymethyl cellulose sodium salt solution and 0.50±0.05 g (0.2 g as solid content) of an aqueous dispersion of styrene/butadiene rubber having a weight average molecular weight of 270,000 were stirred in a hybrid mixer for 5 minutes and then defoamed for 30 seconds to obtain a slurry.

This slurry was coated in a width of 5 cm on a 18 μm-thick copper foil as a current collector by a doctor blade method to give a negative electrode material coverage of 12.4±0.1 mg/cm² and then air-dried at room temperature. After further drying at 110° C. for 30 minutes, the density of the active material layer was adjusted to 1.60±0.03 g/cm³ by roll-pressing with a roller of 20 cm in diameter, whereby a negative electrode sheet was obtained.

(ii) Production Method of Nonaqueous Secondary Battery

The negative electrode sheet produced by the method above was punched into a square of 4 cm×3 cm and used as the negative electrode, and a positive electrode composed of $LiCoO_2$ was punched into the same area and combined. A separator (made of porous polyethylene film) impregnated with an electrolytic solution obtained by dissolving $LiPF_6$ in a mixed solvent of ethylene carbonate, ethyl methyl carbonate and dimethyl carbonate (volume ratio=20:20:60) to give a concentration of 1 mol/L and further adding 2 vol % of vinyl carbonate as an additive was placed between the negative electrode and the positive electrode to produce a laminate-type battery.

(iii) Measuring Method of Cell Swelling Amount at High-Temperature Endurance Test The laminate-type battery produced by the method above was left standing for 12 hours, subsequently charged at a current density of 0.2 CmA/cm³ until the potential difference between two electrodes reached 4.1 V, and then discharged at 0.2 CmA/cm³ until the potential difference became 3 V. After repeating this operation twice, the battery was further charged at the same current value until the potential difference between two electrodes became 4.2 V. The swelling amount a (mL) generated so far was measured by an immersion volumetric method (a solvent displacement method based on Archimedes's principle). Thereafter, the battery was left standing in a constant-temperature chamber at 85° C. for 24 hours, and the swelling amount b (mL) was further determined. The value of "a+b (mL)" was taken as the "cell swelling amount in high-temperature endurance test". The results in Table 1 were obtained by performing the measurement for each of two laminate-type batteries and determining the average thereof.

Example 1

Spherical natural graphite having a surface functional group amount O/C value of 2.90% as measured by the measuring method above was stirred in a mixed acid solution of concentrated hydrochloric acid (33 wt %) and concentrated nitric acid (40 wt %) (concentrated hydrochloric acid:concentrated nitric acid (weight ratio)=1:1) at 80° C. for 4 hours, washed with pure water until the pH became 4 or more, and then filtered. The sample obtained here was further stirred in concentrated sulfuric acid (93 wt %) at 80° C. for 4 hours, washed with pure water until the pH became 4 or more, and then held at 300° C. for 6 hours to obtain a sample. With respect to this sample, the particle diameter d50, tap density, BET specific surface area (SA), Raman R value, surface functional group amount O/C value, surface functional group amount $S_{165}/C$ value, surface functional group amount Cl/C value, 3R/2H, fluidity index a, and swelling amount of laminate cell in a high-temperature endurance test at 85° C. for 24 hours ("cell swelling amount at high-temperature endurance test") were measured by the methods described above. The results are shown in Table 1.

Example 2

Spherical natural graphite having a surface functional group amount O/C value of 3.04% as measured by the measuring method above was stirred in a mixed acid solution of concentrated hydrochloric acid and concentrated nitric acid (concentrated hydrochloric acid:concentrated nitric acid (weight ratio)=1:1) at 80° C. for 8 hours, washed with pure water until the pH became 4 or more, and then filtered. The sample obtained here was further stirred in concentrated sulfuric acid at 80° C. for 4 hours, washed with pure water until the pH became 4 or more, and then held at 300° C. for 6 hours to obtain a sample. With respect to this sample, the same measurements as in Example 1 were performed. The results are shown in Table 1.

Example 3

Spherical natural graphite having a surface functional group amount O/C value of 3.66% as measured by the measuring method above was stirred in a mixed acid solution of concentrated hydrochloric acid and concentrated nitric acid (concentrated hydrochloric acid:concentrated nitric acid (weight ratio)=1:1) at 80° C. for 2 hours, washed with pure water until the pH became 4 or more, and then filtered. The sample obtained here was further stirred in concentrated sulfuric acid at 80° C. for 2 hours, washed with pure water until the pH became 4 or more, and then held at 300° C. for 6 hours to obtain a sample. With respect to this sample, the same measurements as in Example 1 were performed. The results are shown in Table 1.

Example 4

Spherical natural graphite having a surface functional group amount O/C value of 3.24% as measured by the measuring method above was stirred in a mixed acid solution of concentrated hydrochloric acid and concentrated nitric acid (concentrated hydrochloric acid:concentrated nitric acid (weight ratio)=1:1) at 80° C. for 4 hours, washed with pure water until the pH became 4 or more, and then filtered. The sample obtained here was further stirred in concentrated sulfuric acid at 80° C. for 4 hours, washed with pure water until the pH became 4 or more, and then held at 300° C. for 6 hours to obtain a sample. With respect to this sample, the same measurements as in Example 1 were performed. The results are shown in Table 1.

Comparative Example 1

The same measurements as in Example 1 were performed using natural graphite (SGB20, produced by Kropfmuhl). The results are shown in Table 1.

Comparative Example 2

The graphite particle described in Example 4 was filled in a graphite crucible, and in an electric furnace under a nitrogen atmosphere, the temperature was raised from room temperature to 1,000° C. over 48 hours, held at 1,000° C. for 3 hours, and then lowered to near room temperature over 48 hours. From the obtained graphite particles, coarse particles were removed through a 45-μm sieve to obtain a sample. With respect to this sample, the same measurements as in Example 1 were performed. The results are shown in Table 1.

TABLE 1

|  | O/C, % | $S_{165}$/C + Cl/C, % | Cell Swelling Amount in High-Temperature Endurance Test, ml | $d_{50}$, μm | SA, m²/g | Tap Density, g/cm³ | Fluidity Index a | Raman R Value | 3R/2H |
|---|---|---|---|---|---|---|---|---|---|
| Example 1 | 2.80 | 0.11 | 0.29 | 18.9 | 5.4 | 0.90 | 0.52 | 0.19 | 0.27 |
| Example 2 | 2.85 | 0.29 | 0.31 | 21.0 | 5.2 | 0.90 | 0.48 | 0.18 | 0.27 |
| Example 3 | 3.56 | 0.07 | 0.31 | 16.2 | 7.1 | 0.99 | 0.45 | 0.24 | 0.28 |
| Example 4 | 3.16 | 0.08 | 0.29 | 10.4 | 8.7 | 0.79 |  | 0.20 | 0.29 |
| Comparative Example 1 | 3.13 | 0.02 | 0.33 | 19.3 | 6.2 | 0.93 | 0.55 | 0.17 | 0.21 |
| Comparative Example 2 | 0.68 | 0.07 | 0.31 | 10.7 | 9.4 | 0.84 |  | 0.21 | 0.28 |

As seen in Table 1, in the carbon material of Comparative Example 1, the surface functional group amount O/C value falls in the specified range of the present invention but since an acid contract treatment is not performed, the sum (Cl/C+$S_{165}$/C) of the surface functional group amount Cl/C value and the surface functional group amount $S_{165}$/C value falls much below the specified value, as a result, the cell swelling amount in high-temperature endurance test is increased.

Also, in the carbon material of Comparative Example 2, the sum (Cl/C+$S_{165}$/C) of the surface functional group amount Cl/C value and the surface functional group amount $S_{165}$/C value falls in the specified range of the present invention, but the O/C value falls much below the specified value due to performing a heat treatment at 1,000° C., as a result, the cell swelling amount in high-temperature endurance test is increased as compared with Example 4 where a heat treatment at 1,000° C. is not performed.

On the other hand, in the carbon materials of Examples 1 to 4, all physical properties fall in the specified ranges of the present invention, as a result, the cell swelling amount in high-temperature endurance test is reduced.

Industrial Applicability

The carbon material of the present invention can provide a lithium ion secondary battery with high capacity, excellent high-temperature storage characteristics and small gas generation amount by using it as an active material for lithium ion battery. Also, according to the production method of the carbon material, the number of steps is small and in turn, the material can be stably and efficiently produced at a low cost.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2009-038092) filed on Feb. 20, 2009, the entirety of which is incorporated herein by way of reference.

The invention claimed is:

1. A carbon material for lithium ion secondary battery having a surface functional group amount O/C, a surface functional group amount Cl/C, and a surface functional group amount S165/C, wherein the surface functional group amount O/C value represented by the following formula 1 is from 1 to 4% and a sum (Cl/C+S165/C) of the surface functional group amount Cl/C value represented by the following formula 2 and the surface functional group amount S165/C value represented by the following formula 3 is from 0.05 to 0.5%:

O/C value (%)=O atom concentration determined based on the peak area of the spectrum of O1s in X-ray photoelectron spectroscopy (XPS) analysis/C atom concentration determined based on the peak area of the spectrum of C1s in XPS analysis×100     Formula 1:

Cl/C value (%)=Cl atom concentration determined based on the peak area of the spectrum of Cl2p in XPS analysis/C atom concentration determined based on the peak area of the spectrum of C1s in XPS analysis×100     Formula 2:

S165/C value (%)=S165 atom concentration based on the peak area of the peak near 165 eV in the spectrum corresponding to S2p in XPS analysis/C atom concentration determined based on the peak area of the spectrum of C1s in XPS analysis×100     Formula 3.

2. The carbon material for lithium ion secondary battery as claimed in claim 1, wherein the BET specific surface area (SA) is from 4 to 11 m2/g, the tap density is from 0.7 to 1.3 g/cm3, the Raman R value is from 0.15 to 0.4, and the fluidity index is from 0.4 to 0.53.

3. The carbon material for lithium ion secondary battery as claimed in claim 1, wherein the abundance ratio (3R/2H) of rhombohedral crystal to hexagonal crystal, obtained from X-ray structural analysis (XRD), is 0.20 or more.

4. The carbon material for lithium ion secondary battery as claimed in claim 1, which is produced by a production method comprising: contacting raw material graphite with an acid containing at least one of hydrochloric acid and sulfuric acid; and heat-treating said graphite contacted with said acid at 100 to 600° C.

5. The carbon material for lithium ion secondary battery as claimed in claim 4, wherein the raw material graphite described in claim 4 is natural graphite subjected to a spheroidization treatment, and the surface functional group amount O/C value represented by the formula 1 above of said spheroidized natural graphite is from 1 to 4%.

6. A negative electrode for lithium ion secondary battery, comprising a current collector and an active material layer formed on said current collector, wherein said active material layer contains the carbon material claimed in claim 1.

7. A lithium ion secondary battery comprising: a positive electrode and a negative electrode capable of storing and releasing lithium ion; and an electrolyte, wherein said negative electrode is the negative electrode for lithium ion secondary battery claimed in claim 6.

* * * * *